United States Patent
Harada et al.

(10) Patent No.: US 6,230,082 B1
(45) Date of Patent: May 8, 2001

(54) VEHICLE-USE DATA BACKUP SYSTEM AND ON-VEHICLE TERMINAL APPARATUS COMPRISED IN THE SYSTEM

(75) Inventors: Tomoyasu Harada; Kouichi Ando, both of Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/132,328

(22) Filed: Aug. 11, 1998

(30) Foreign Application Priority Data

Oct. 3, 1997 (JP) .................................................... 9-271091

(51) Int. Cl.[7] ................................ H04B 7/26; G08G 1/09
(52) U.S. Cl. ................................ 701/1; 701/35; 701/209; 701/211; 180/272; 180/273; 364/444
(58) Field of Search ................................ 701/1, 201, 209, 701/35, 211; 364/444; 180/272, 273

(56) References Cited

U.S. PATENT DOCUMENTS

| | | | |
|---|---|---|---|
| 4,664,218 | * | 5/1987 | Graham et al. ........................ 180/272 |
| 4,819,174 | * | 4/1989 | Furuno et al. ........................ 364/444 |
| 5,107,428 | * | 4/1992 | Bethencourt et al. ........... 364/424.04 |
| 5,594,942 | * | 1/1997 | Antic et al. .......................... 455/33.1 |
| 5,790,976 | * | 8/1998 | Boll et al. .............................. 701/209 |
| 5,839,086 | * | 11/1998 | Hirano ................................... 701/201 |
| 5,964,813 | * | 10/1999 | Ishii et al. ............................... 701/35 |

FOREIGN PATENT DOCUMENTS

| | | | |
|---|---|---|---|
| 2235996 | * | 3/1991 | (GB) . |
| 3-270466 | | 12/1991 | (JP) . |
| 07182024 | * | 7/1995 | (JP) . |
| 08096294 | * | 4/1996 | (JP) . |
| 10138780 | * | 5/1998 | (JP) . |
| 10209954 | * | 8/1998 | (JP) . |

* cited by examiner

*Primary Examiner*—William A. Cuchlinski, Jr.
*Assistant Examiner*—Tuan C. To
(74) *Attorney, Agent, or Firm*—Finnegan, Henderson, Farabow, Garrett & Dunner, L.L.P.

(57) ABSTRACT

An information center backs up the vehicle-use data of an on-vehicle terminal apparatus. The vehicle-use data used by the on-vehicle terminal apparatus is classified into standard data or custom data. The standard data is used in the same manner by numerous vehicles, while custom data is unique to each vehicle. The custom data is sent unchanged to the information center but, for the standard data, identification codes are sent rather than the raw standard data. This data is backed up and stored in the information center, where they remain available for retrieval should the data on the vehicle side be damaged. Because the volume of backup data is reduced, the communication time can be shortened and the required backup memory capacity in the information center can be reduced.

10 Claims, 3 Drawing Sheets

| | | |
|---|---|---|
| STAN-DARD DATA | - INITIALLY PROVIDED DATA<br>- DATA OBTAINED EXTERNALLY (PARTIALLY) | (SPECIFIC EXAMPLES)<br><br>OPERATING SYSTEMS<br>NAVIGATION SOFTWARE<br>E-MAIL SOFTWARE |
| CUS-TOM DATA | - MODIFIED PORTION OF STANDARD DATA<br>- DATA ENTERED BY USERS<br>- DATA OBTAINED EXTERNALLY | (SPECIFIC EXAMPLES)<br><br>DISPLAY SETTINGS (COLOR PREFERENCES, ETC.)<br>REGISTRATION POINT DATA<br>APPLICATION PROGRAMS OBTAINED FROM NETWORKS |

Fig. 2

VEHICLE-USE DATA BACKUP SYSTEM AND ON-VEHICLE TERMINAL APPARATUS COMPRISED IN THE SYSTEM

BACKGROUND OF THE INVENTION

1. Field of the Invention

The present invention relates to a vehicle-use data backup system which backs up and stores in a center outside a vehicle the vehicle-use data used by an on-vehicle terminal apparatus. In the present invention, the vehicle-use data indicate the data used for execution of the program and the program data itself.

2. Description of the Related Art

A computer system mounted on a vehicle as an on-vehicle terminal apparatus has been proposed as a part of the so-called ITS (Intelligent Transport Systems) technology. The proposed on-vehicle terminal apparatus has navigation and other functions and connects with an information center via a communication means, while the information center connects with many vehicles and sends useful data to each vehicle. The on-vehicle terminal apparatus may in some cases have other network terminal functions.

The vehicle-use data used by the on-vehicle terminal apparatus is stored in an appropriate storage medium, such as a hard disk or the like. As mentioned above, this vehicle-use data may include program data such as applications or the like, as well as the information (navigation map data and the like) used by this and other programs. The on-vehicle terminal apparatus has an advantage that it can obtain a variety external vehicle-use data. In turn, users can change the vehicle-use data and enter their specific data so that they may set up or customize the on-vehicle terminal apparatus according to their desired specification. Therefore, each on-vehicle terminal apparatus has its own respective collection of vehicle-use data or, in other words, each vehicle has different vehicle-use data. With the advance of said ITS technology, it is projected that the vehicle-use data for each vehicle will grow more diversified.

The vehicle-use data is stored on a storage medium such as a hard disk or the like as mentioned above. Since vehicles generate vibration and shock, such a data storage medium is used in relatively harsh conditions. Accordingly, the data written to the data storage medium may have become corrupted or the data storage medium itself may be damaged. In such a case, the vehicle-use data cannot be recovered by merely replacing the data storage medium. In particular, if various data specific to each vehicle is stored as described above, it is difficult to recover such lost data because it is difficult to recompile all the data that had been obtained externally up to that date and to reproduce customized data.

To enable recovery of the vehicle-use data, it is effective to back up the data. The information center that handles data communication with the on-vehicle terminal apparatus can be used as a backup site. In Japanese Patent Laid-Open No. Hei 3-270466, a system of this type is proposed in the field of facsimile communication. However, vehicle-use data systems communicating with the information center had yet to be developed. Moreover, such systems did not allow for each individual vehicle using customized data. Hence, backup was not required and appropriate techniques for dealing with data damage were not proposed.

The volumes of vehicle-use data creates an additional problem related to vehicle-use data backup. Because of the volume of data, data transmission to the information center for backup requires a large amount of time. Further, since the volume of data per vehicle is large, the information center must reserve an extremely large storage capacity for back up data of all the target vehicles. It is desirable that this backup memory capacity should be reduced as much as possible.

SUMMARY OF THE INVENTION

The purpose of the present invention is to provide a vehicle-use data backup system which can reduce the storage capacity of the center side for backing up the vehicle-use data and reduce the data transmission time for backing up the vehicle-use data.

To achieve this purpose, the vehicle-use data backup system of this invention backs up and saves the vehicle-use data used by an on-vehicle terminal apparatus in a backup center which handles data communication with a vehicle. The vehicle-use data backup system of this invention comprises an on-vehicle storage means provided on said on-vehicle terminal apparatus and which stores custom data unique to the vehicle along with other, standard data as said vehicle-use data and a backup storage means provided on said backup center which individually backs up and stores said vehicle-use data of each vehicle. Said backup storage means stores the raw custom data and identification codes indicating standard data rather than the raw standard data. The backup center may, for example, be said information center but may also be other centers.

It may also be desirable that backup transmission which sends said custom data and the identification code data indicating said standard data from the vehicle to the backup center be executed and that the data sent by the backup transmission be stored in said backup storage means.

As described above, in the present invention, the vehicle-use data to be backed up is classified into standard data and custom data. The standard data is data that is commonly used by multiple vehicles. However, it is not necessary that the standard data be used by all vehicles. On the other hand, the custom data is unique to each vehicle. Each vehicle uses its own custom data. For example, the custom data are created when users registered their specific settings or the like in the on-vehicle terminal apparatus. Also, as described above, the vehicle-use data may contain both the data used by a program and the program data itself. In the present invention, necessary data can be backed up appropriately.

For example, the standard data are installed in the on-vehicle terminal apparatus before purchase. For example, the standard data is also obtained from the outside of the vehicle and ordinarily obtained and used to some extent by various vehicles. On the other hand, the custom data is, for example, the changed portion of the data when the existing vehicle-use data were changed. For example, the custom data is also entered by the users themselves. Moreover, for example, the custom data may be externally obtained yet not used by certain vehicles because they are special to some extent.

According to the present invention, for the standard data provided in the vehicle, the backup center stores identification codes identifying the standard data because the standard data can be recovered if the identification codes are available. The backup center can prepare the standard data corresponding to the identification codes by itself and can also obtain them externally. On the other hand, for custom data, the custom data is itself stored in the backup center. Since the custom data differs for every vehicle and it is difficult to later recover the custom data if the entire data has not been stored.

As described above, with the present invention, the standard data for each vehicle is backed up and saved in the information center in the form of identification codes, therefore the waste of storing the same standard data of multiple vehicles in the information center can be eliminated. By storing only identification codes and custom data, the vehicle-use data can still be recovered when data damage, including loss or the like, occurs, but the memory capacity of the backup center can be reduced because of reduction in the volume of backup data and the communication time when data is sent to the backup center can be shortened. As a result, the data can be efficiently backed up.

Also, in the present invention, identification codes indicating the standard data may be used to indicate either a single standard data item or a group of multiple standard data.

In one aspect of the present invention, it is desirable that said backup transmission be executed when specified conditions are met on the vehicle side. For example, these specified conditions may be that the specified setting timing is reached or that the specified processing (engine stoppage or the like) is executed. Then, the backup transmission can automatically be executed at an appropriate timing.

In another aspect of the present invention, the execution frequency of the backup transmission of the identification code data indicating said standard data is set smaller than the frequency of the backup transmission of said custom data, as the occurrences of updating or adding the standard data is assumed to be less than that of the custom data. When the backup frequencies of both data are made identical, the standard data is wastefully backed up too frequently, while the backup intervals of the custom data are too far apart. According to this aspect, by setting different backup transmission frequencies for both types of data, necessary backup can be carried out while the execution of invalid backup transmission can be reduced. Hence, more efficient backup and storage are enabled.

It may also be preferable for the backup system of the present invention to contain a request means for requesting the backup center to send the backed up and saved vehicle-use data to the vehicle and preferable that, in response to the request of the return transmission, the backup center sends the custom data and the standard data corresponding to the identification code data to the vehicle. This data is used to recover the data.

It may also be preferable that said backup storage means stores the vehicle-use data, associating them with vehicle identification information and that said request means provides said vehicle identification information as the request for return transmission which said request means sends to said backup center. The vehicle-use data can be retrieved using the vehicle identification information as a key.

It may further be preferable that the request of said return transmission by said request means be executed when the vehicle-use data stored in said vehicle storage means were damaged and that the data within said vehicle storage means be recovered using the vehicle-use data that was sent from the backup center.

BRIEF DESCRIPTION OF THE DRAWINGS

FIG. 2 is a drawing illustrating examples of the standard data and the custom data.

DESCRIPTION OF THE PREFERRED EMBODIMENT

Figure 1:
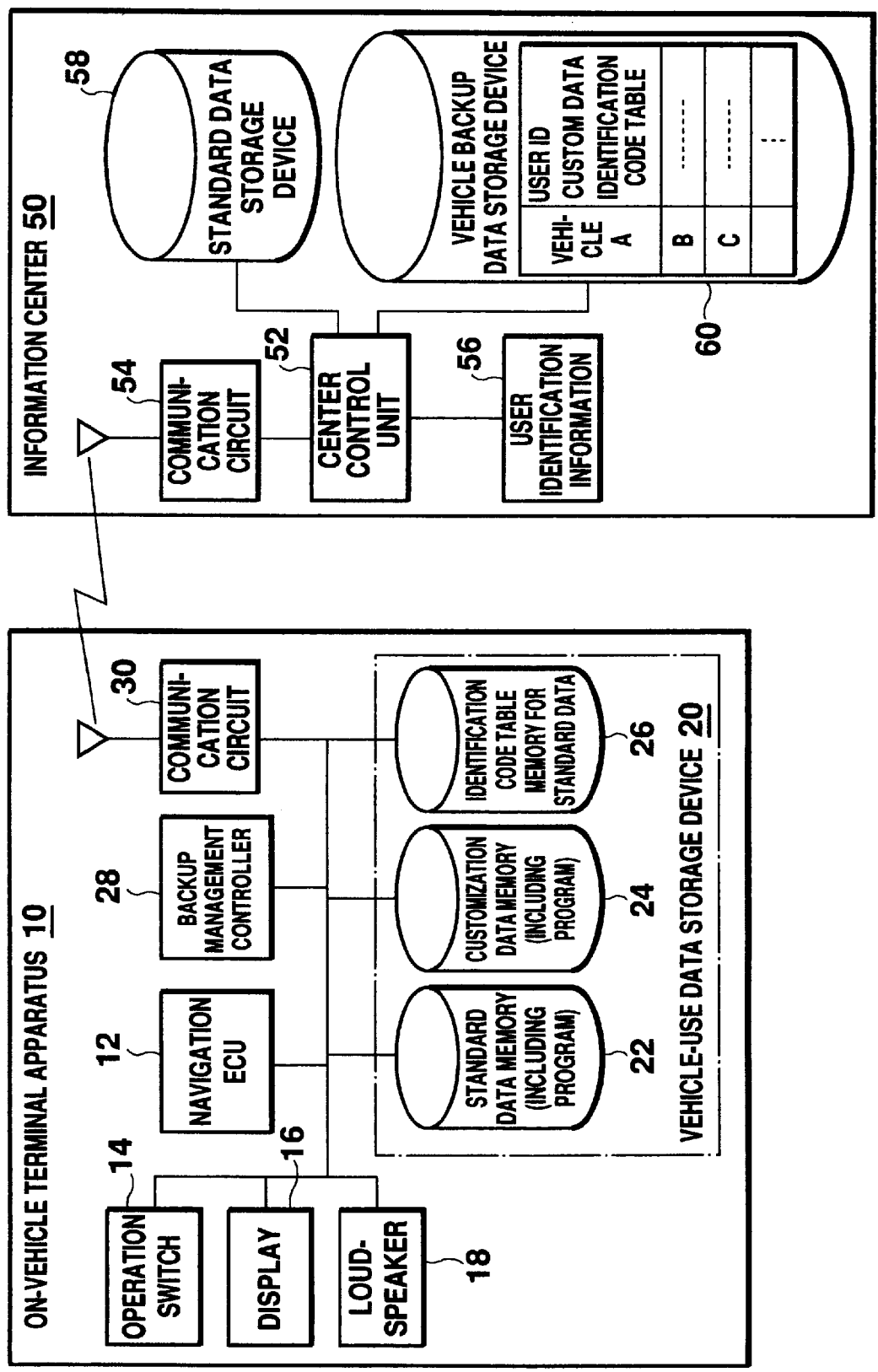
FIG. 1 is a block diagram illustrating the overall configuration of an embodiment of the present invention.

The preferred embodiment of the present invention will next be described referring to the drawings. FIG. 1 is a block diagram illustrating the overall configuration of the apparatus according to the present invention. In this embodiment, an information center 50 is connected to an on-vehicle terminal apparatus 10. The information center 50 handles data communication with the on-vehicle apparatus 10 to provide various data. In the present invention, the information center 50 also functions as a backup center.

As shown in FIG. 1, a navigation ECU 12 is provided in the on-vehicle terminal apparatus 10. This navigation ECU 12 comprises a CPU, controls the entire terminal, and performs various processing related to navigation. The navigation ECU 12 is shown as an example of the configuration in which vehicle-use data is used. In this embodiment, an appropriate unit other than the navigation ECU 12 can also be installed. Moreover, both the navigation ECU 12 and another unit can be installed together and can also be combined.

The on-vehicle terminal apparatus 10 is provided with an operation switch 14 as an input means with which users enter various instructions and can also be provided with a voice recognition device as an input means. A display 16 and a loudspeaker 18 are also provided as output means. Furthermore, a GPS device (not illustrated) that detects the current position and sends it to the navigation ECU 12 is provided.

The on-vehicle terminal apparatus 10 also comprises a vehicle-use data storage device 20. The vehicle-use data storage device 20 stores the vehicle-use data used by the on-vehicle terminal apparatus 10. As described before, the vehicle-use data contain data (navigation map data or the like) used as a processing object at program execution and the program data itself. The vehicle-use data storage device 20 is provided with a standard data memory 22 and a custom data memory 24. In this embodiment, the vehicle-use data is classified as either standard data or custom data. The standard data is stored in the standard data memory 22 and the custom data is stored in the custom data memory 24. FIG. 2 is an example of the classification of standard data and custom data.

The standard data is data that can be commonly used by a plurality of vehicles. However, the standard data need not to be used by all vehicles. As shown in FIG. 2, the data provided as a standard from the beginning of purchase is cited as an example of the standard data. The standard data also includes data that was obtained from the information center 50 and ordinarily obtained and used to some extent by various vehicles. The standard data can also be data that was obtained by a technique other than the communication with the information center 50, for example, those obtained using an appropriate network. Specific examples of the standard data include Os software, navigation software, and e-mail software.

On the other hand, the custom data is specific to each on-vehicle terminal apparatus 10, that is, it is used only by a single terminal. As shown in FIG. 2, the custom data is created when users customize standard data by rewriting or the like. Further, the data entered by users themselves using the operation switch 14 is also custom data. Part of the external data that is obtained from the information center 50, another network, or the like is also custom data. Specific examples of custom data include the data (color preferences and the like) related to the setting of navigation screen display and registration point data. The registration point data is generated by registering the places, names, profiles, and the like of the users' favorite facilities (stores and the like) using the operation switch 14. Also, the external acquisition data contained in the custom data includes, for example, application programs and map-related information that is special to some extent and is not used by other vehicles.

The macroinstruction program portion or the like among the application programs corresponds to the custom data and is written to the custom data memory 24. At this point, the main portion of the program is standard data which is stored and fixed in the standard data memory 22, and is therefore not rewritten. When executing such a program, both the program data of the standard data memory 22 and that of the custom data memory 24 are referenced as requested.

If the macroinstruction program portion and main program portion cannot be separated, all the programs can be moved from the standard data memory 22 to the custom data memory 24. Otherwise, original data can be left in the standard data memory 22 and all the custom data can be stored in the custom data memory 24. In addition, if the data of the custom portion cannot be separated from the data of the main portion, the same action as above is taken.

Referring to FIG. 1 again, the vehicle-use data storage device 20 is also provided with an identification code table memory 26 that stores a table of identification codes. In this embodiment, identification codes (numbers and symbols) identifying the standard data are assigned to all standard data. The identification code table is a table of identification codes of the standard data that is actually stored in the standard data memory 22.

Identification codes indicating a group of plurality of standard data items can be used. For example, if the standard data stored in the standard data memory 22 is fixed at the point of sale for every vehicle type, a code indicating the vehicle type can be used as an identification code for an initial standard data group.

In this embodiment, the vehicle-use data storage device 20 stores data in a storage medium, a hard disk or the like being suitable for the vehicle-use data storage device 20. The vehicle-use data storage device 20 can be a single storage device or also be divided into multiple storage devices. For example, one part of the vehicle-use data storage device 20 can be a hard disk device and the other part a CD-ROM.

In FIG. 1, the on-vehicle terminal apparatus 10 is also provided with a backup management controller 28. The backup management controller 28 performs the processing within the vehicle-use data storage device 20 related to the vehicle-use data backup.

Based on the data in the standard memory 22, the backup management controller 28 generates the identification code table and stores it in the identification code table memory 26. The backup management controller 28 monitors data reading from and writing to the standard data memory 22 and updates the identification code table so that the table will reflect the standard data in the standard data memory 22.

The backup management controller 28 also manages data communication with the information center 50 using a communication circuit 30. The backup management controller 28 reads backup data from the vehicle-use data storage device 20, sends it to the information center 50, and requests the information center 50 to store the sent data (backup transmission).

A feature of this embodiment is that, in the backup transmission, the custom data stored in the custom data memory 24 and the identification code table stored in the identification table memory 26 are sent. In other words, the identification codes are sent instead of sending the standard data itself. If the identification codes are provided, it can be identified which standard data was retained in a vehicle when action is taken in response to data damage (including loss or the like). This greatly reduces the volume of backup data. On the other hand, all custom data is sent to the information center 50 because it is impossible to completely recover the data of the custom data memory 24 when the data damage occurred if all of the data is not backed up.

The backup management controller 28 also functions as a request means that requests the information center 50 to transmit data that was backed up. In this embodiment, it is called "return transmission" when the information center 50 sends the backed lip and stored data to a vehicle in response to such a request. The return transmission request is generated and sent to the information center using the communication circuit 30 when the data of the vehicle storage device 20 has been damaged.

Said backup management controller 28 can also be installed together with the navigation ECU 12.

In the next place, the configuration of the information center 50 is described. The information center 50 installs a center control unit 52 and the center control unit 52 controls the entire center. The center control unit 52 references a user ID stored in a user identification information storage unit 56 and individually handles data communication between vehicles using a communication circuit 54.

A standard data storage device 58 is connected to the center control unit 52. The standard data storage device 58 stores various standard data. A vehicle backup data storage device 60 is also connected to the center control unit 52. As previously described, the identification code table of the standard data and the custom data are sent from each vehicle as backup data. The backup data is received by the communication circuit and transmitted to the center control unit 52 which in turn writes the backup data to the vehicle backup data storage device 60. The storage device 60 separately stores the backup data of each vehicle, as illustrated in FIG. 1. For Vehicle A, the user ID of Vehicle A and the custom data and identification code table of Vehicle A are stored. The same data is also stored for the other vehicles (B, C, . . . ).

In response to the return transmission request from each vehicle, the center control unit 52 reads the backed up and saved data and sends it to the vehicle using the communication circuit 54. At this time, the custom data is read from the vehicle backup data storage device 60 and is forwarded completely. Moreover, for the standard data, the center control unit 52 reads the identification code table from the storage device 60 and then reads the standard data indicated by each identification code within the table from the standard data storage device 58. The read standard data are sent to the vehicle.

[Back Up]

Next, the operation of the backup system in this embodiment will be described with the operation when vehicle-use data is backed up in the information center as a precaution against data damage being described first.

The backup management controller 28 of the on-vehicle terminal apparatus 10 reads the custom data and the identification code table from the custom data memory 24 and the identification code table memory 26 and sends the read data to the information center 50 using the communication circuit 30. The data is received by the communication circuit 54 of the information center 50 and transmitted to the center control unit 52, which in turn backs up and saves the sent data by writing it to the vehicle backup data storage device 60. The storage device 60 has an individual storage area for each vehicle.

Said backup transmission is repeated at appropriate intervals.

In the first backup transmission, the complete custom data and the identification code table is sent. In the second or subsequent backup transmission, only the difference data is sent. The difference data indicates the difference between the data of the vehicle-use data storage device 20 at preceding transmission and the data at current transmission. The center control unit 52 reflects the difference data in the data within the storage device 60.

For example, when difference data indicating an additional portion of the custom data is sent, the additional portion is added to the custom data already stored in the storage device 60. If difference data indicating deleted data is sent, the relevant portion of the data within the storage device 60 is deleted. If the contents of a modified portion of the custom data is contained in the difference data, the custom data within the storage device 60 is modified in accordance with the difference data. Even for the identification code table, the same processing is performed and codes are added, deleted, and modified.

As described above, by using the difference data for backup, the volume of data transmission is reduced and the communication time can be further shortened.

[Back Up Timing]

Several different settings of backup timing are preferable, as described below.

(1) Periodic Automatic Backup at a Designated Cycle

The backup management controller 28 measures the elapsed time from the preceding backup transmission. Whenever a specified time elapses, i.e. every setting cycle, the backup management controller 28 executes the backup transmission. For example, backup is performed at the same hour everyday or the backup is performed once every several days or at the same day every week. The backup timing may be set to a default value, set automatically by the backup management and control section 28, or be set by the user.

In this case, it is desirable that the backup cycle of the identification code table should be less frequent than that of the custom data. Hence, the backup frequency of the identification code table is set smaller than that of the custom data. Changes in the standard data are assumed to take place much less frequently than changes in the custom data. When the standard data is backed up too frequently, unnecessary communication is performed because the same data is backed up repeatedly. On the other hand, when the backup frequency of the custom data is too small, it is likely that the data will not be backed up even when it has greatly changed. In this embodiment, by individually setting the standard data and custom data backup frequencies, the respective data formats are backed up at an approximate timing and unnecessary communication is reduced.

When performing automatic backup, it may also be preferable to query a user about the desirability of backup before executing backup transmission. In this case, the backup management controller 28 queries the user as to whether or not backup is to be executed using a combination of the display 16 and the loudspeaker 18. The user uses the operation switch 14 to input backup instructions. When permission is received, the backup transmission is executed. When rejection is received, the backup is halted. Such user input can also be similarly applied to the automatic backup described below.

(2) Periodic Automatic Backup after a Specified Event

The specified event may include vehicle stoppage, engine stoppage, or the like. The generation of the event is detected by the backup management controller 28. For example, the backup transmission is performed after the engine has been turned off. The processing or the like which occurs at certain intervals is desirable for the specified event. It is also desirable for the specified event to occur at a timing suitable for backup and at a timing where the communication with the information center 50 can be favorably carried out. The specified event may be set to a default value, be set automatically by the backup management controller 28, or be set by users themselves.

Even in this case, it remains preferable that the backup frequency of the identification code table be set smaller than that of the custom data. For example, the backup transmission of the identification code table could be set such that the process is executed whenever the engine has been stopped ten times. On the other hand, the backup transmission of the custom data could be executed each time the engine has stopped. In this way the frequencies will differ.

(3) Automatic Backup when Data is Changed

The backup management controller 28 monitors the read and write processing of the vehicle-use data storage device 20 through the navigation ECU12. The controller 28 determines whether or not changes (addition, deletion, and modification) to the custom data or the identification code table have occurred. Whenever changes have occurred, the difference data indicating the changed portion is transmitted for backup.

(4) Manual Backup

When a user judges that backup is necessary, they instruct the execution of backup by operating the operation switch 14. The backup process is advanced in accordance with the screen displayed on the display 16 and the voice guidance output from the loudspeaker 18 corresponding to the switching operation. It is also suitable to construct such that users can specify the data to be backed up.

The user selects whether or not to execute backup at which timing of said items (1) to (4). The mode of executing and type of processing is set corresponding to the user input. The mode can also be set so that multiple types of processing can be executed. For example, while periodic backup is being performed, the backup may also be performed when a specified event has occurred. The mode can automatically be set by the backup management controller 28.

[Data Recovery]

Data recovery processing when the data within the vehicle-use data storage device 20 on the vehicle side is damaged will next be described. The stored data within the vehicle-use data storage device 20 may cause a fault in some cases. The vehicle-use data storage device 20 may itself also cause a fault, and in this case the fault is first repaired. For example, a damaged storage medium or the vehicle-use data storage device itself is replaced.

The backup management controller 28 sends a request for return transmission to the information center 50 using the communication circuit 30. This request contains a user ID for identifying a vehicle. The return transmission can automatically be sent by the backup management controller 28. Otherwise, when users instruct the data recovery using the operation switch 14, the backup management controller 28 may also send the request to the information center 50 in accordance with this instruction.

Figure 3:
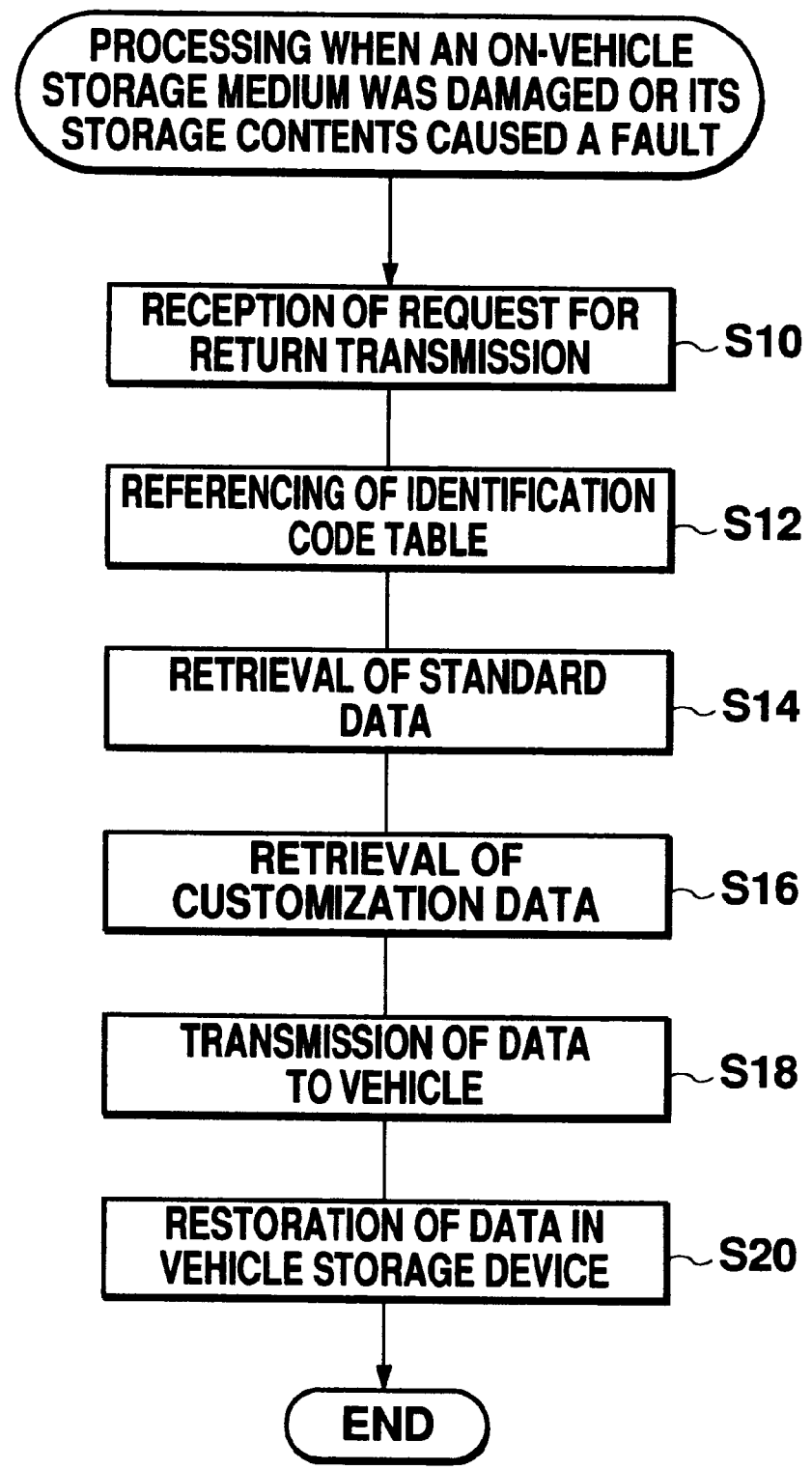
FIG. 3 is a flowchart illustrating the processing when recovering damaged data.

As shown in FIG. 3, the request for return transmission is received by the communication circuit 54 in the information center 50 and then forwarded to the center control unit 52 (S10). The center control unit 52 sends the data of the relevant vehicle to the vehicle (return transmission) in response to the request from the vehicle. According to the supplied user ID, the identification code table of the relevant vehicle within the vehicle backup data storage device 60 is referenced (S12). The standard data indicated by each identification code within the table is then retrieved from the standard data storage device 58 (S14). Also, again based on the user ID, the custom data of the relevant vehicle is retrieved from the vehicle backup data storage device 60 (S16). The retrieved standard and custom data are sent to the vehicle (S18).

On the vehicle side, the custom data and the standard data are written to the respective standard data memory 22 and the custom data memory 24 (S20). This restoration recovers the damaged data of the vehicle-use data storage device 20. The backup management controller 28 recreates the identification code table based on the data after recovery and writes it to the identification code table memory 26.

It is possible that only part of the data of the vehicle-use data storage device 20 may be damaged. In such a case, although the data may be restored, it is desirable that just the damaged data be recovered. For example, when only the standard data were damaged, the request of return transmission of just the standard data is sent to the information center 50. In response to this, the returned standard data are restored to the standard data memory 22.

The preferred embodiment of the present invention has been described above. According to this embodiment, the identification code table and the custom data are sent to the information center and stored as backup data. Accordingly, the volume of backup data can be reduced while backing up the data so that they can be recovered in case of data damage. Hence, the backup communication time can be shortened. The storage capacity of a storage device to be reserved for backup can greatly be reduced on the information center side. As a result, the efficiency of the vehicle-use data backup required under the background in which each vehicle holds its unique, various, and diversified data can be improved.

According to this embodiment, as described above, the backup frequency of the identification code table is set to less than that of the custom data. This helps reduce unnecessary backup transmission and allows accurately backup of each type of data at appropriate intervals.

As shown in FIG. 1, the navigation ECU 12 is installed and the on-vehicle terminal apparatus 10 functions as a center communication type navigation device. This embodiment is not restricted to such a configuration and an appropriate unit other than the navigation ECU 12 can be utilized. Moreover, the navigation ECU 12 or another unit can be installed together or combined.

Also, although it was described that the information center functions as a backup center of the present invention and backs tip and stores the data of multiple vehicles, the backup center can also be provided separately from the information center. A computer system (personal computer or the like) belonging to the family of a vehicle user could also be used as the backup center. In this case, it is also suitable to set the backup timing at the time when the user returns home.

Also, although it was described that the information center 50 stores the standard data in the standard data storage device 58, necessary standard data can appropriately be externally obtained without installing the standard data storage device 58. Such a configuration is assumed to be suitable in particular when said family personal computer is used as a backup center.

While in the configuration shown in FIG. 1, the vehicle and the information center carried out radio communication, this communication can equally be carried out using other means such as a satellite or wired communication. When a family personal computer is used, it would probably be preferable to carry out wired communication.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A vehicle-use data backup system for backing up and storing vehicle-use data used by an on-vehicle terminal apparatus in a backup center which handles data communication with the vehicle, said system comprising:

an on-vehicle storage means provided on said on-vehicle terminal apparatus which stores custom data unique to the vehicle along with other standard data as said vehicle-use data; and a backup storage means which is provided on said backup center which individually stores said vehicle-use data of each vehicle; and said backup storage means stores said custom data and also stores identification codes identifying the standard data.

2. A vehicle-use data backup system as claimed in claim 1 wherein backup transmission which sends said custom data and the identification code data indicating said standard data from the vehicle to the backup center is executed and wherein the data sent by the backup transmission are stored in said backup storage means.

3. A vehicle-use data backup system as claimed in claim 2 wherein said backup transmission is executed when specified conditions are met on the vehicle side.

4. A vehicle-use data backup system as claimed in claim 2 wherein an execution frequency of the backup transmission of the identification code data indicating said standard data is set lower than an execution frequency of the backup transmission of said custom data.

5. A vehicle-use data backup system as claimed in claim 2 wherein said backup transmission sends the difference data which indicates an additional portion of the vehicle-use data stored on the vehicle side.

6. A vehicle-use data backup system as claimed in claim 1 wherein the on-vehicle terminal apparatus comprises a request means for requesting the backup center to send to the vehicle a return transmission which includes the backed up and saved vehicle-use data and wherein, in response to the request for said return transmission, the backup center sends said custom data to the vehicle and also sends to the vehicle said standard data that correspond to said identification code data.

7. A vehicle-use data backup system as claimed in claim 6 wherein said backup storage means stores the vehicle-use data, associating them with vehicle identification information and wherein the request for return transmission which the request means sends to the backup center includes said vehicle identification information.

8. A vehicle-use data backup system as claimed in claim 6 wherein the request for said return transmission by said request means is executed when the vehicle-use data stored in said vehicle storage means were damaged and wherein the data within said vehicle storage means are recovered using the vehicle-use data sent from the backup center in reply.

9. An on-vehicle terminal apparatus for requesting a backup center to back up and store of vehicle-use data used in a vehicle using data communication comprising:

a vehicle storage means for storing custom data which is unique to the vehicle and other standard data as said vehicle-use data;

a transmission means that sends to the backup center said custom data and identification codes indicating standard data;

a request means that requests the backup center for a return transmission containing the backed up and saved vehicle-use data; and a receiving means that receives said custom data and said standard data which correspond to said identification code data sent by the backup center in response to the request for return transmission.

10. An on-vehicle terminal apparatus as claimed in claim 9 wherein the request for return transmission by said request means is executed when the vehicle-use data stored in said vehicle storage means were damaged and wherein the data within said vehicle storage means were recovered using the vehicle-use data that were returned by the backup center.

* * * * *